United States Patent [19]

Laussermair et al.

[11] 4,276,068

[45] Jun. 30, 1981

[54] SWIRL CHAMBER APPARATUS

[75] Inventors: Friedrich Laussermair, Krailling; Eberhard Willeitner, Utting a. Ammersee, both of Fed. Rep. of Germany

[73] Assignee: M.A.N. Maschinenfabrik Augsburg-Nürnberg Aktiengesellschaft, Munich, Fed. Rep. of Germany

[21] Appl. No.: 946,191

[22] Filed: Sep. 27, 1978

[30] Foreign Application Priority Data

Sep. 27, 1977 [DE] Fed. Rep. of Germany ....... 2743391

[51] Int. Cl.³ .............................................. B01D 45/12
[52] U.S. Cl. .......................................... 55/348; 55/17; 55/396; 55/404; 55/409
[58] Field of Search ................... 55/17, 348, 349, 396, 55/400, 401, 406–409, 205, 207, 404; 233/DIG. 1; 308/DIG. 1

[56] References Cited

U.S. PATENT DOCUMENTS 3,626,664  12/1971  Hoffstrom ................................ 55/17

FOREIGN PATENT DOCUMENTS

| 875461 | 9/1942 | France | 55/17 |
| 32560 | 12/1970 | Japan | 233/DIG. 1 |
| 43769 | 12/1974 | Japan | 233/DIG. 1 |
| 197712 | 12/1977 | Netherlands | 233/DIG. 1 |
| 760669 | 11/1956 | United Kingdom | 55/348 |
| 972349 | 10/1964 | United Kingdom | 308/DIG. 1 |

*Primary Examiner*—David L. Lacey
*Attorney, Agent, or Firm*—Craig & Antonelli

[57] ABSTRACT

Swirl tube or chamber apparatus is provided for separating isotope or gas mixtures of a process gas having heavy and light gas fractions intermixed. This apparatus includes a swirl chamber having feed ports issuing tangentially thereinto for feeding processed gas to be effectively centrifuged in the swirl chamber. Extraction elements are provided for extracting the heavy gas fraction from the outer walls of the swirl chamber and for extracting the light gas fraction from the interior of the cylinder near the longitudinal axis thereof. The swirl chamber is a rotatably support chamber which is symmetrically configured with respect to its center. In particularly preferred embodiments, the process gas fed into the swirl chamber also serves to form a bearing cushion for the container, as well as for imparting driving forces to the container to rotate the same.

20 Claims, 7 Drawing Figures

SWIRL CHAMBER APPARATUS

BACKGROUND AND SUMMARY OF THE INVENTION

The invention relates to swirl chambers for separating gas mixtures of the type having a feed port issuing tangentially into the chamber for the gas mixture, an extraction element extending from the area of the inner wall of the chamber for the heavy gas fraction, and a second extraction element extending from the inner central area of the chamber for the light gas fraction.

Among the feasible processes proposed for separating gas mixtures and isotope mixtures has been the swirl tube process. In certain contemplated arrangements a gas jet is introduced tangentially into a fixedly arranged tube. Rotation of the gases aided by the potential whirl effect causes the heavy particles to be separated from the light particles as a result of the centrifugal pressure field.

For implementing this process, a swirl chamber has been proposed which takes a conical shape and has an end wall at the major-diameter end. At this end, inclined inlet ports are provided at a tangent to the end wall through which the gas mixture is introduced. Owing to the circular cross-section of the chamber the medium is caused to rotate and flow azimuthally in the direction of the chamber axis towards the opposite end. At this minor-diameter end the heavy gas fraction is extracted while the light gas fraction rotating in the inward areas flows back axially and is exhausted through an extraction pipe extending through the front wall of the whirl or swirl chamber. This process provides a disadvantage, however, in that the angular momentum is diminished by wall friction and that, moreover, turbulent flow and attendant remixing losses are produced, making the separation work very poor despite the higher gas inlet velocity.

A broad aspect of the present invention is to provide an improved swirl chamber of the type noted above which achieves high separating outputs. It is a particular object of especially preferred embodiments of the present invention to achieve this aspect by means of a swirl chamber having a rotationally symmetrical, rotatably supported container. In preferred embodiments the wall of the chamber is caused to rotate in the rotational direction of the gas, so that when the two speeds are equaled, the wall friction is reduced to zero. This permits a largely laminar, helical flow of high velocity to be achieved, enabling effective separation of the heavy from the light gas particles.

To facilitate manufacture, certain preferred embodiments utilize a swirl chamber in the shape of a tubular cylinder. Because of the negligible wall friction the gas stream will maintain the angular momentum it had upon entering throughout its course in the swirl chamber. In certain other preferred arrangements, however, the swirl chamber or container is given a conical shape, so that the reduction in diameter will accelerate the gas stream and so increase the angular momentum for additionally improved separating work.

In a preferred embodiment of the present invention the container is driven by a gas jet, for which use is made particularly of process gas which is to be separated. In this arrangement, the container is surrounded by a stationary wall provided with tangentially directed nozzles allowing the motive gas to flow through the wall and impinge on slots or vanes of the container. These passageways may concurrently form the inlet ports for the feed gas. This will obviate the need for separate manufacturing provisions for the gas ducts on the one hand and cause the circumferential speed of the container to attain the inlet velocity of the process gas on the other.

In a further aspect of the present invention the container is preferably supported by gas and preferably imbedded in a gas cushion surrounding the container shell. The absence of friction with this arrangement prevents the inlet energy of the process gas from being diminished, so that the co-rotating swirl chamber achieves a notable gain in efficiency over previously disclosed stationary swirl chambers.

In certain preferred embodiments, for supporting the container, use is made of the process gas as it is for driving it, the process gas being diverted either from the fresh gas or from the swirl chamber. The bearing may optionally be pressurized also by these two measures combined.

To improve the starting and emergency performance, a sliding layer, preferably of graphite, is provided on the inner side of the stationary wall surrounding the container.

A further improvement in efficiency is achieved by making the swirl chamber a double chamber having a common gas inlet arranged in the central area according to certain preferred embodiments. This obviates the need for one front wall, so that the potential swirl required for separation of the components may develop more fully. The double chamber is preferably made to taper at the two ends. This will augment the angular momentum of the whirl flow and additionally cause the supporting gas surrounding the container to impose a measure also of axial pressure on the container, ensuring smooth and stable rotation of the swirl chamber also in the absence of a separate axial bearing.

With the double swirl chamber the heavy gas fraction is extracted at the two ends, where suitable outlet ports are provided. The light fraction is extracted through pipes which are either inserted into the chamber from the front sides of the container or which are arranged centrally in the chamber to catch the flow of light gas fraction directed axially towards the center of the chamber on both sides. It is an additional advantage if the extraction pipes are made to co-rotate as integral parts of the container according to certain preferred embodiments. This serves to prevent friction losses also at the extraction system.

These and further objects, features and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
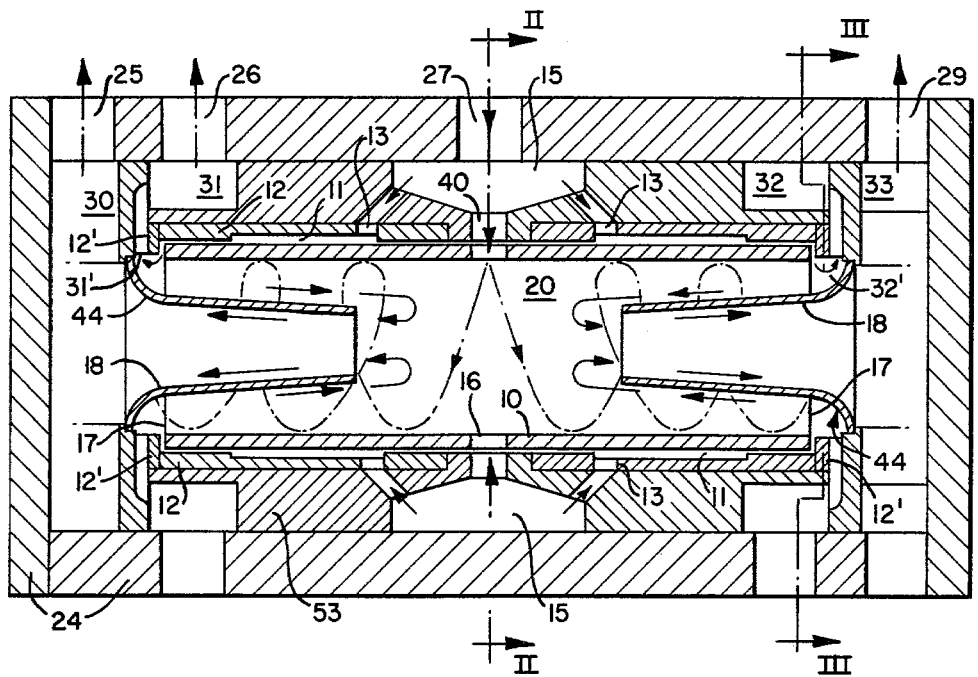
FIG. 1 is a schematic longitudinal sectional view of swirl tube apparatus constructed in accordance with a preferred embodiment of the invention.

Throughout the drawing figures, similar reference numerals will be used to designate similar features. Unless otherwise specifically indicated, the arrows in the drawing figures depict direction of gas flows.

With reference now to FIG. 1 a cylindrical swirl chamber is shown which has a cylindrical swirl tube or container 10 carried in two annular static gas bearings 11. The gas cushions or bearings 11 are provided in a recess in wall 12 surrounding the container 10, the wall 12 having passageways 13 to establish communication between the recess 11 for the gas bearing and feed line 15 for the gas mixture to be separated. Wall 12 is formed of graphite and is retained in component 53. Passageways 13 extend through the wall 12 and the component 53.

The container 10 exhibits feed ports, to be described in more detail below, in its central area and has open ends serving as outlet ports 17 for the heavy gas fraction. Tubular extraction elements 18 are provided for extraction of the light gas fraction, the respective elements 18 axially extending into the interior 20 of the chamber through the open ends of the container 10. The entire system is arranged in a housing 24 containing gas ducts 25, 26, 27, 28 and 29 communicating respectively with the annular ducts 30, 31, 15, 32 and 33, which annular ducts in turn communicate with the respective gas feed and extraction ports.

Figure 2:
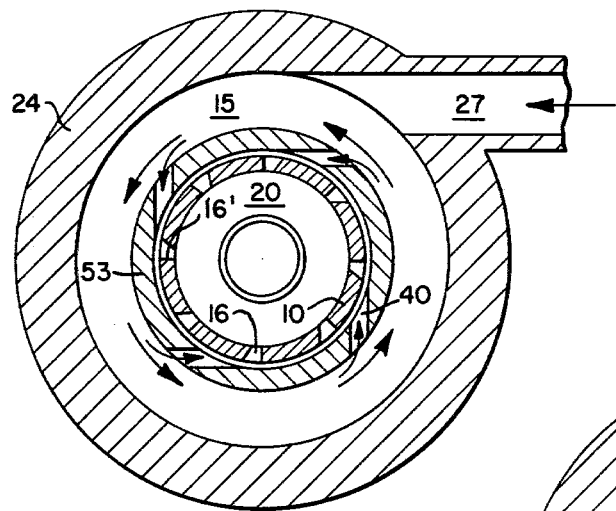
FIG. 2 is a sectional view along line II—II of FIG. 1.

With reference now to FIG. 2, which is a cross-sectional view of the feed area at 27, 15, 16 (sectional view along line II—II of FIG. 1, but rotated 90° clockwise in FIG. 2 to facilitate illustration) the fresh mixture of gas is introduced through a gas duct 27 of the housing 24, the gas duct 27 issuing tangentially into the annulus 15. This causes the gas in the annulus 15 to rotate and enter through the tangential nozzles 40, where it is accelerated, to impinge tangentially on the container 10, causing container 10 to rotate, and to enter in circulating flow the chamber space 20 through the feed ports 16. For effective rotation of the container 10 the essentially inclined ports 16 passing through the wall of the container 10 are provided with an approximately radially extending impingement wall 16' for the motive gas. For the same purpose, the container 10 can optionally be fitted with rotor vanes according to other contemplated embodiments.

The gas entering the chamber 20 flows symmetrically in spirally circulating flow to the two ends of the whirl or swirl chamber, where as a result of centrifugal force the heavier particles seek the wall zone of the chamber and the lighter particles seek the inner zone of the chamber 20.

The heavy gas fraction is exhausted through the annular ducts 31 and 32 opening into the peripheral area of the housing 24 at gas ducts 26 and 28 respectively. The preponderantly inner flow hits a concave wall 44 and is deflected back towards the center of the chamber. The concave walls 44 are formed by annular endpieces of the extraction elements 18, so that the flow is guided continuously by this endpiece and the shell of the tube, which together form a conical annular shape, and permits regular return flow in the absence of turbulence. This helically returned gas is exhausted through the extraction elements 18 and the annular ducts 30 and 33, which in turn communicate with gas ducts 25 and 29 through the housing 24.

Figure 3:
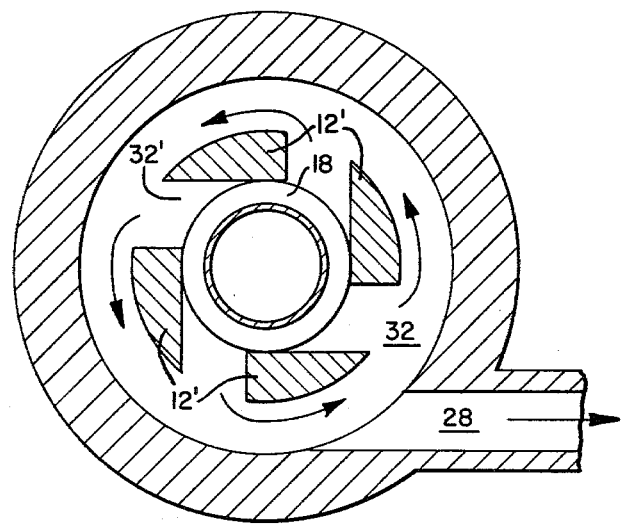
FIG. 3 is a sectional view along line III—III of FIG. 1.

FIG. 3 is a cross-sectional view (sectional view along line III—III of FIG. 1, but rotated 90° counterclockwise in FIG. 3 to facilitate illustration) of the extraction point for the heavy gas fraction, where the outlet 28 is extending tangentially away from annular space 32. A similar heavy gas fraction extraction point is disposed at the opposite end with outlet 26 communicating gas from annular space 31. The end wall portions 12', which also serve to limit axial movement of container or tube 10, are configured to define flow paths 31', 32' for the heavy gas fraction.

Figure 4:
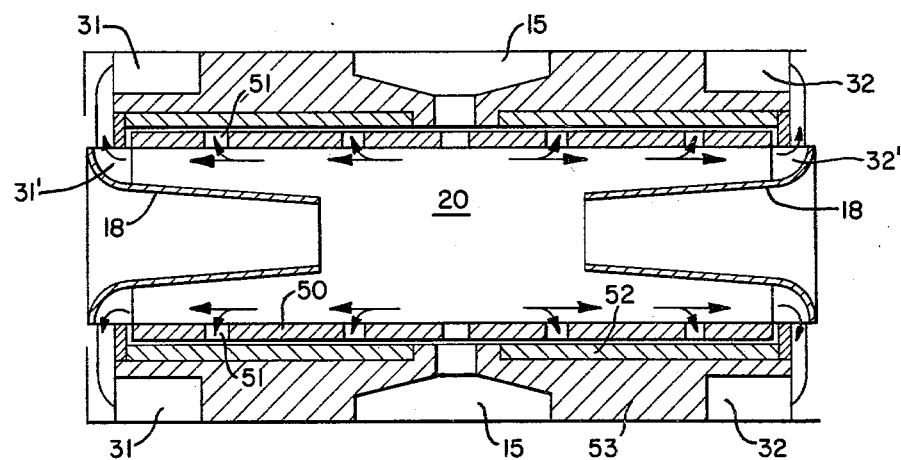
FIG. 4 is a schematic longitudinal sectional view of swirl tube apparatus constructed in accordance with a second preferred embodiment of the invention.

It is also practical to support the container 10 in a dynamic gas bearing as shown in FIG. 4, where a rotatable container 50 is provided with several passageways 51 for the flow of process gas to form a dynamic gas cushion between the container 10 and a wall 52 surrounding the container. Other aspects of the embodiment of FIG. 4 are similar to the embodiment of FIG. 1, and therefore the details of the housing 24, and the various inlet and outlet ducts are not shown or described. In this case a portion of the heavy fraction is carried into the annulus 32 and 31, respectively, through these passageways 51 and the gas bearing. The wall 52, like wall 12 of the FIG. 1 embodiment consists of sliding material, preferably graphite, retained in a component 53. Wall 52 differs from wall 12 in that wall 52 does not have passageways 13 due to the different gas bearing construction.

In the examples described above the extraction element 18 for the light gas fraction are fixedly attached to the housing 24. Other embodiments are contemplated where these elements are connected to the whirl chamber for co-rotation with it as a separate component attached to the chamber or as an integral part manufactured together with the swirl chamber.

Figure 5:
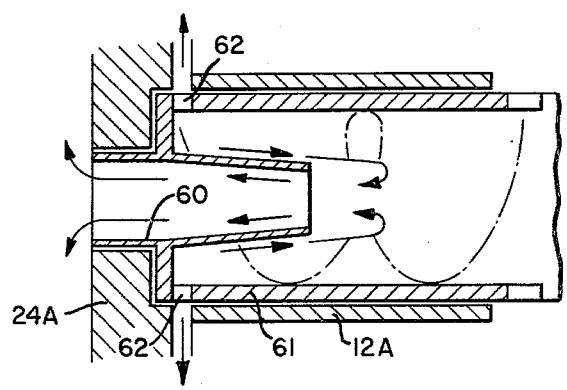
FIG. 5 is a schematic longitudinal sectional view of swirl tube apparatus constructed in accordance with a third preferred embodiment of the invention.

FIG. 5 shows an embodiment where the extraction element 60 is integrated into the rotatable container 61 to form a structural unit. In this case ports 62 are provided in the wall area of the whirl tube 61 for extraction of the heavy gas fraction. Since other aspects of the FIG. 5 embodiment are similar to the FIG. 1 (or FIG. 4) embodiment, FIG. 5 is only a partial figure with schematic depiction of part of a housing 24A and graphite wall 12A.

Figure 6:
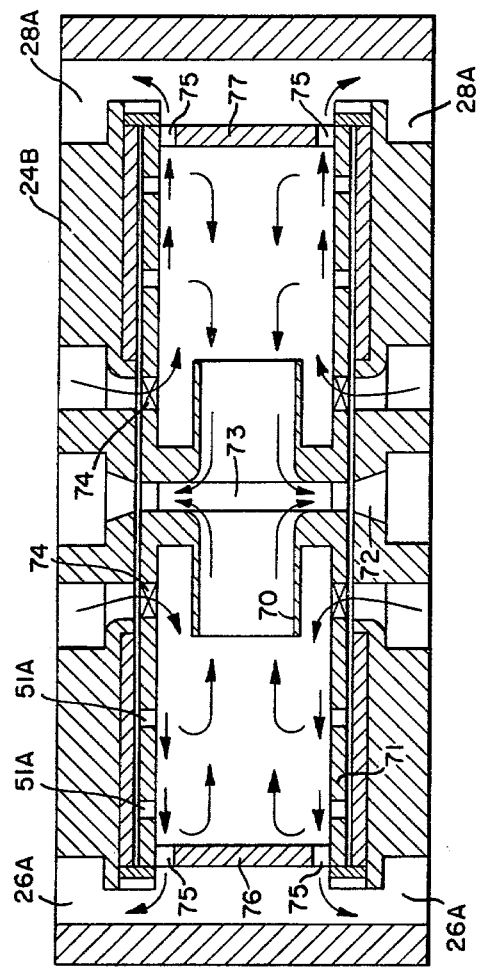
FIG. 6 is a schematic longitudinal sectional view of swirl tube apparatus constructed in accordance with a fourth embodiment of the invention.

Embodiments are also contemplated wherein the light gas fraction is extracted from the longitudinal center, rather than the ends of the rotating tube or container. FIG. 6 illustrates such an arrangement, where a tubular extraction element 70 is manufactured together with the container 71. The extraction element 70 has in its central area several light gas fraction outlet ports 73 opening into an annulus 72 of the housing 24B. Arranged in symmetry with these outlet ports are on both sides the feed ports 74 for the mixed gas. This Figure 6 embodiment includes dynamic bearing structure similar to the FIG. 4 embodiment with apertures 51A in the walls of the container 71. The heavy gas fraction is extracted by way of apertures 75 in respective container end walls 76, 77, which apertures communicate with extraction ducts 26A, 28A. The light gas fraction which reaches the ends of the container rebounds off of the respective end walls 76, 77 and returns to the extraction element 70 and ports 73.

Figure 7:
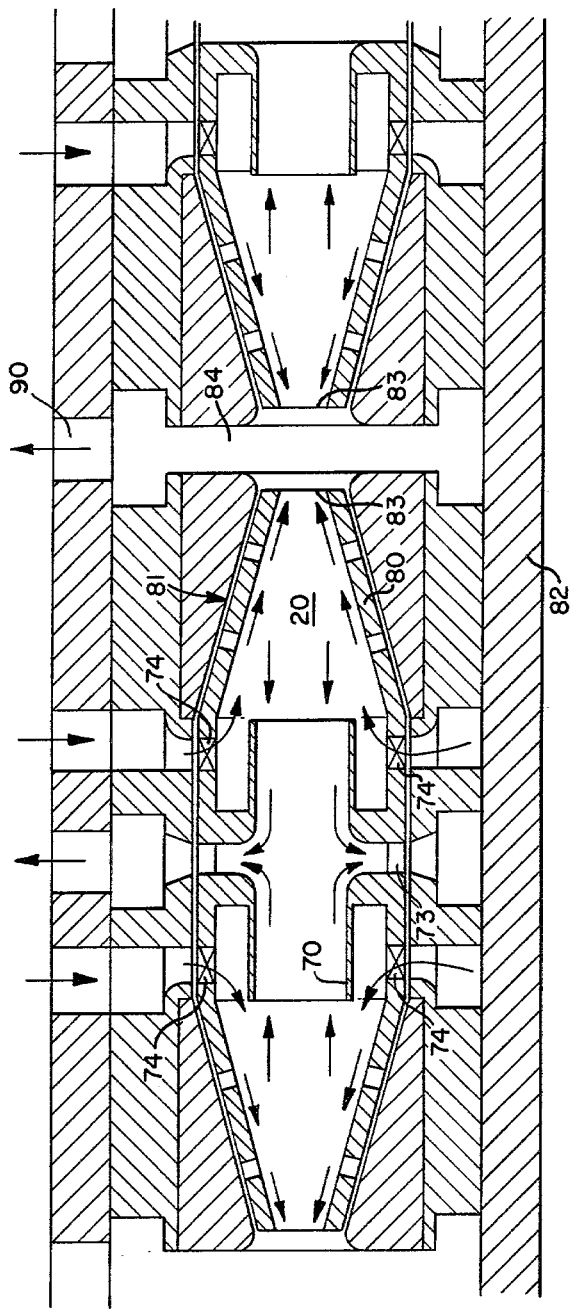
FIG. 7 is a schematic longitudinal sectional view of swirl tube apparatus constructed in accordance with a fifth embodiment of the invention.

FIG. 7 illustrates a swirl chamber corresponding to the example of FIG. 6 insofar as the central extraction of the light gas fraction and the dynamic gas bearing is concerned, hence the corresponding structures of FIG. 6 are designated by corresponding, but primed, reference numerals. However the ends 80 of the container 81 are tapered. This taper of the chamber in the direction of the whirl flow serves to raise the rotational speed and thus the angular momentum.

FIG. 7 also shows two swirl chambers in combined arrangement, where a common cylindrical housing 82 is provided in which are arranged two or more swirl chambers axially side by side. In this arrangement, where the light gas fraction is extracted from the center of the swirl chamber and the heavy fraction from the ends, it will be sufficient to place the swirl chambers side by side. The extraction ports 83 of two adjacent swirl chambers here issue into a common annulus 84 of the housing 82, from where the fraction issuing from the two adjacent chambers is exhausted via duct opening 90. The process gas is fed and the light gas fraction extracted through feed and extraction elements 74 and 73, respectively, associated separately with the respective whirl chambers.

For a joint arrangement of swirl chambers of the type shown in FIG. 1, it will be necessary to modify the gas extraction of the two fractions. In this case, one extraction element for the light fraction from each of two adjacent swirl chambers issues into a common annulus like annulus 84 in FIG. 7, while the other gas fraction must in this case be withdrawn separately for each chamber.

To avoid undue length of description this specification only generally describes the double swirl chambers. They provide an advantage in that their axial symmetry permits excellent combinations to be achieved between gas feed, drive and bearing support by means of the process gas at a minimum of manufacturing effort and a minimum of overall size. The assignee company of the present application is also the owner of a related German patent application Ser. No. P 27 43 995.8, filed in Germany on Sept. 30, 1977, and a corresponding U.S. application, Ser. No. 946,219, filed Sept. 27, 1978, which applications describe and claim various features of double swirl chamber constructions.

Shown also as preferred embodiments herein are gas driven and gas supported swirl chambers. These factors again contribute to a simpler system by exploiting the existing gas stream, where naturally their advantages of little friction losses and the attending greater efficiency should additionally be considered. In this respect the combination of the gas bearing with the process gas again simplifies the swirl chamber, where in the entire system there is only one gas in circulation, avoiding sealing and mixing problems between two separate gases.

Other embodiments are also contemplated in which an outside source of gas is used to generate the gas bearing and/or the gas drive. It is also contemplated to use the various novel features of the described embodiments of the invention in other arrangements than those specifically described and illustrated. For example, the novel swirl chamber of the present invention can alternatively be supported and driven, however, in any manner known in the state of the art. Also the novel gas bearing provisions described and the drive can be used also in connection with asymmetrical swirl tubes, where the gas is fed at one end, e.g., and flows in one direction only.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Swirl tube or chamber apparatus for separating isotope or gas mixture of a process gas having heavy and light gas fractions, comprising:
   a swirl chamber,
   first extraction element means for extracting a heavy gas fraction from the swirl chamber,
   and second extraction element means for extracting a light gas from the swirl chamber,
   wherein said swirl chamber is a rotatably supported hollow container, having the hollow portion defined by a wall, which is symmetrically configured with respect to a plane extending transverse to its rotational axis, said container being fitted with slot means adapted to be rotatably driven by the process gas, and
   further including means for rotatably supporting said container comprising a member spaced from and surrounding at least part of said container, and passage means for passing process gas to the space between the member and the container, whereby a gas bearing is formed in the space between the member and the container,
   said member having guiding means for directing process gas to impinge against said slot means, whereby the process gas rotatably drives the container, and
   at least one feed port issuing tangentially into the swirl chamber for feeding process gas thereto, with gas feed means for feeding process gas to said at least one feed port.

2. Apparatus according to claim 1, wherein the swirl chamber is a rotatably supported tubular cylinder.

3. Apparatus according to claim 1, wherein the swirl chamber is a rotatably supported, part conically shaped container.

4. Apparatus according to claim 1, wherein the member spaced from and at least partially surrounding said container is a stationary wall, and wherein said guiding means is adapted to direct said process gas to impinge tangentially on said container against said slot means.

5. Apparatus according to claim 1 wherein the at least one feed port opens into the swirl chamber at one end of the swirl chamber while the first extraction element means is arranged at the other end of the chamber.

6. Apparatus according to claim 1 wherein the at least one feed port is arranged in the central area of the wall of the container and in that one extraction element of the first extraction element means is provided at each of the ends of the chamber.

7. Apparatus according to claim 1, wherein the second extraction element means includes an extraction pipe extending into the central area of the interior of the chamber.

8. Apparatus according to claim 7, wherein the extraction pipe is positioned such that it extends into the swirl chamber at its front end.

9. Apparatus according to claim 8, wherein the extraction pipe is fixedly connected to the rotatably supported container.

10. Apparatus according to claim 8, wherein the extraction pipe has a conical shape and extends into the swirl chamber with its minor diameter end.

11. Apparatus according to claim 1, wherein the swirl chamber is tapered at both ends.

12. Apparatus according to claim 1, comprising a plurality of said swirl chambers arranged in line in a common housing.

13. Apparatus according to claim 1, wherein said member is made at least in part of graphite.

14. Apparatus according to claim 1, wherein said member has recesses therein in the surface adjacent to said swirl container, whereby the gas bearing is provided in said recesses.

15. Apparatus according to claim 14, wherein the passage means for passing process gas to the space between the member and container extends through said member to said recesses to provide gas flow communication to said recesses.

16. Apparatus according to claim 15, wherein said gas feed means is in flow communication with said passage means, whereby said process gas flows into said recesses to provide the gas bearing.

17. Apparatus according to claim 1, wherein said passage means for passing process gas to the space between the member and container extends from the interior of the container to the space between the member and the container, whereby process gas can flow from the interior of the container to said space to form a dynamic gas cushion.

18. Apparatus according to claim 1, wherein said slot means comprises inclined slots in the wall of the container, said inclined slots having an approximately radially extending impingement wall which is adapted to be impinged on by said process gas.

19. Apparatus according to claim 18, wherein the inclined slots extend through the container wall to form openings therethrough, which openings serve as said at least one feed port so that the feed gas can concurrently drive the container.

20. Apparatus according to claim 19, wherein the container is tapered at both ends.

* * * * *